March 31, 1942.  T. BOKICH  2,277,659
FRICTION DRIVE
Filed June 20, 1940
FIG. 1.
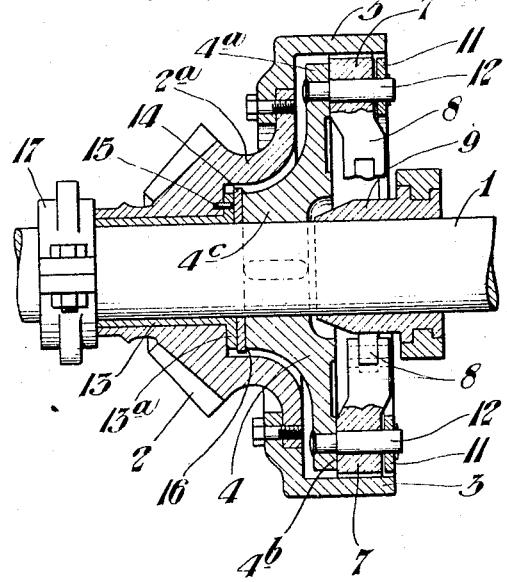
FIG. 2.
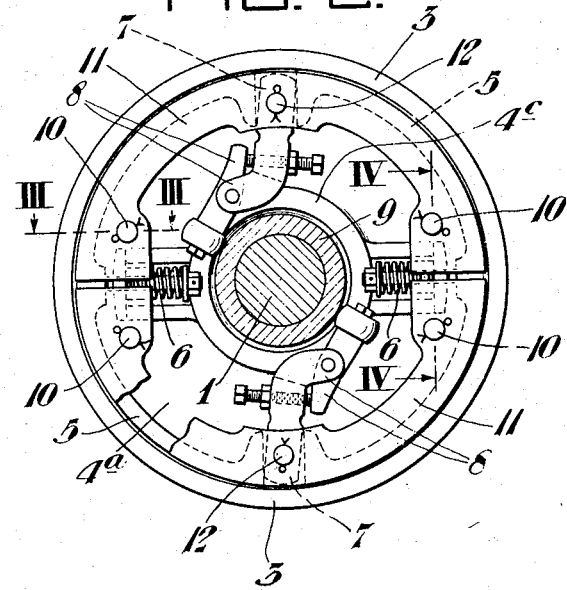
FIG. 3.
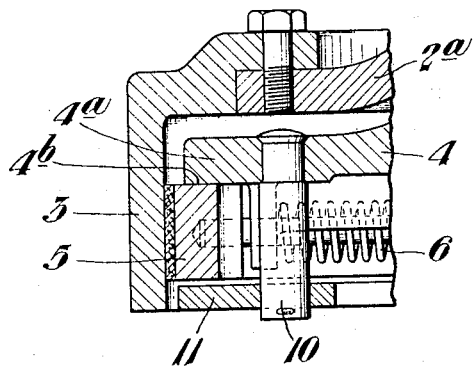
FIG. 4.
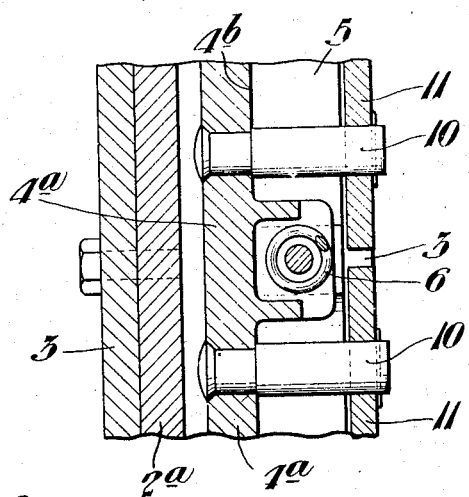
FIG. 5.
Inventor:
TONY BOKICH,
by: John E. Jackson
his Attorney.

Patented Mar. 31, 1942

2,277,659

UNITED STATES PATENT OFFICE 2,277,659

FRICTION DRIVE

Tony Bokich, Gary, Ind.

Application June 20, 1940, Serial No. 341,539

2 Claims. (Cl. 192—78)

This invention relates to friction drives in general, but it is particularly concerned with heavy duty clutches of the type used on steam cranes for transmitting power to the track wheels.

A specific example of the invention is illustrated by the accompanying drawing:

Figure 1 being a longitudinal section;

Figure 2, a front view;

Figure 3, a section from the line III—III in Figure 2;

Figure 4, a section from the line IV—IV in Figure 2; and

Figure 5, an enlargement from Figure 1.

More specifically, the drawing shows a clutch of the type used to transmit power from the constantly turning crankshaft 1 of a steam crane to the pinion 2 which transmits the power to the track wheels of the crane. The clutch is conventional in so far as it includes an open ended drum 3 connecting with the pinion 2 and providing an internal cylindrical surface with a mount assembly 4 inside the drum and rotatively free therefrom, this assembly being keyed to the shaft 1 and turning with the same.

The assembly 4 includes radial parts 4ª providing surfaces 4ᵇ facing the open end of the drum and spaced from this end, shoes 5 being positioned by the assembly laterally against the surfaces 4ᵇ with external cylindrical faces for engaging the drum face. The shoes are radially positioned by the assembly 4 through the medium of spring retracting arrangements 6 which do not prevent lateral displacement of the shoes, the shoes being expanded against the force of the springs of the arrangements 6 by cams 7 between the opposed ends of the shoes. Cam action is secured through leverage systems 8 worked by a cam collar 9 sliding on the shaft 1.

The illustrated clutch is unconventional in that four posts 10 extend laterally from the surfaces 4ᵇ inside the shoes 5 to beyond the outer sides of these shoes. These posts are spaced on either side of the two spring retracting arrangements 6 remote from the cams 7 which are located circumferentially midway between these arrangements, and mount a ring plate 11 outside the shoes 5 and which extends from the drum periphery radially inwardly to positively retain the shoes and the cam 7 in position against movement away from the surfaces 4ᵇ. The ring plate 11 is made in two sections and is cotter-pinned in place between the posts 10 whereby the ring plate may be removed from around the shaft 1 when required.

The usual way of mounting the cam 7 is by way of pivot pins 12 screwed into the radial parts 4ª of the assembly 4, the cams being retained against slipping off the ends of the pins by a ring plate screwed to the periphery of the drum 3 instead of one that is mounted as described above. This prior art arrangement results in the cam pivot pins 12 becoming wobbly due to their cantilever arrangement.

In the case of the clutch of the present invention, the cam pivot pins 12 are made relatively long so that their ends project through holes formed in the ring plate 11 so as to be engaged and supported thereby. This feature is possible only because the ring plate 11 is mounted through the post 10 to the assembly 4 so as to turn with the same as the unit.

The bearing liner 13 for the hub part 2ª of the pinion 2 which connects with the drum 3, provides a thrust bearing ring 13ª which works against a thrust bearing ring 14 provided for the hub part 4ᶜ of the assembly 4. Trouble is usually experienced with these bearing rings because their positions are not fixed in any manner but in the case of the illustrated clutch the bearing ring 13ª is fixed to the hub part 2ª by pins 15 while the bearing ring 14 is fixed to the hub part 4ᶜ by welding 16. This arrangement positively fixes the thrust bearing rings and limits the sliding action to between the bearing surfaces of the two.

The hub part 2ª of the pinion 2 is free to slide longitudinally on the shaft to provide access to the mount assembly 4 and the various elements mounted by the same. Such sliding action is prevented by a separable collar 17 instead of by the usual ring shrunk onto the axle and which makes the entire clutch assembly inaccessible without disassembly of the crane engine parts for the purpose of effecting longitudinal movement of the shaft 1.

I claim:

1. A friction drive of the type including an open ended drum providing an internal cylindrical face, a mount assembly inside the drum rotatively free therefrom and with radial parts providing surfaces facing the open end of the drum spaced therefrom, shoes radially positioned by the assembly laterally against said surfaces with external cylindrical faces for engaging the drum face and cams between the ends of the shoes for forcing them apart so their faces frictionally engage the drum face, said mount assembly being featured by posts extending laterally from said surfaces inside the shoes to beyond their outer sides and a ring plate mounted by said posts outside of the shoes and which extends from the drum periphery radially inwardly to positively retain the shoes and cams in position against movement away from said surfaces, the ring plate being rotatively fixed respecting the mount assembly and the cams being mounted by pivot pins extending laterally from said surfaces with their outer ends engaged and supported by the ring plates, the drum and the mount assembly both being mounted on a common shaft and each having hub parts respectively provided with interengaging thrust bearing rings, the latter being each fixed to its hub part in an immovable manner so the sliding action is limited to between the bearing surfaces of the bearing rings.

2. A friction drive of the type including an open ended drum providing an internal cylindrical face, a mount assembly inside the drum rotatively free therefrom and with radial parts providing surfaces facing the open end of the drum spaced therefrom, shoes radially positioned by the assembly laterally against said surfaces with external cylindrical faces for engaging the drum face and cams between the ends of the shoes for forcing them apart so their faces frictionally engage the drum face, said mount assembly being featured by posts extending laterally from said surfaces inside the shoes to beyond their outer sides and a ring plate mounted by said posts outside of the shoes and which extends from the drum periphery radially inwardly to positively retain the shoes and cams in position against movement away from said surfaces, the ring plate being rotatively fixed respecting the mount assembly and the cams being mounted by pivot pins extending laterally from said surfaces with their outer ends engaged and supported by the ring plates, the drum and the mount assembly both being mounted on a common shaft and each having hub parts respectively provided with interengaging thrust bearing rings, the latter being each fixed to its hub part in an immovable manner so the sliding action is limited to between the bearing surfaces of the bearing rings, the hub part of the drum being free to slide longitudinally on the shaft to provide access to the mount assembly and the elements mounted thereby, and being fixed against such sliding by a releasable means.

TONY BOKICH.